United States Patent [19]

Chandra

[11] 3,856,837

[45] Dec. 24, 1974

[54] SILICON-CONTAINING COMPLEXES
[75] Inventor: Grish Chandra, Glamorgan, Wales
[73] Assignee: Dow Corning Limited, London, England
[22] Filed: Feb. 1, 1973
[21] Appl. No.: 328,566

[52] U.S. Cl....... 260/429 R, 252/431 P, 260/439 R, 260/448.2 H, 260/448.2 E, 260/448.2 R
[51] Int. Cl.......................... C07f 15/00, C07f 15/04
[58] Field of Search .................... 260/429 R, 439 R

[56] References Cited
UNITED STATES PATENTS
3,657,373  4/1972  Peterson ........................ 260/677 R
3,726,809  4/1973  Allum et al. ..................... 252/431 C

OTHER PUBLICATIONS

Goldsberry, Dissertation Abstracts Intern., 30 B, (1969), p. 1,566B.

Primary Examiner—Arthur P. Demers
Attorney, Agent, or Firm—Robert F. Fleming, Jr.

[57]  ABSTRACT

Complexes of nickel, palladium or platinum. The complexes also contain silicon and phosphorus and are useful as hydrosilylation, hydrogenation, polymerisation and isomerisation catalysts.

4 Claims, No Drawings

SILICON-CONTAINING COMPLEXES

This invention relates to new and useful complexes containing phosphorus.

According to the invention there are provided compounds represented by the general formula

[R' R'' R''' P]$_2$ MX$_2$ wherein R' represents the R$_3$SiQ— group in which each R represents an alkyl, aryl, aralkyl or alkaryl radical having less than 19 carbon atoms or a (CH$_3$)$_3$Si— group, not more than one R being (CH$_3$)$_3$Si—, and Q represents a divalent hydrocarbon radical having from 1 to 7 inclusive carbon atoms, R'' and R''' each represents an alkyl, aryl, aralkyl or alkaryl radical having less than 19 carbon atoms or the R$_3$SiQ— group, M represents Ni, Pd or Pt, and each X represents an anionic ligand which is H, Cl, Br, I, —NO$_2$, —NO$_3$, —SCN, —O.CO.CH$_3$, an alkyl, aryl, alkaryl or aralkyl radical having less than 19 carbon atoms or the R$_3$SiQ— group in which R and Q are as hereinabove defined, or the two X substituents taken together represent the —SO$_4$ radical; not more than one X being a hydrogen atom.

In the complexes of this invention the X substituents will normally be the same in a given molecule. They may, however, be different when X is organic, for example, alkyl and must be different when one X is hydrogen. In general the preferred complexes are those in which each X represents a chlorine atom.

The X, R, R'' and R''' may represent inter alia alkyl, aryl, aralkyl or alkaryl radicals having less than 19 carbon atoms, for example methyl, ethyl, butyl, n-octyl, tetradecyl, phenyl, naphthyl, benzyl and 2-phenylethyl. When present such radicals are preferably those having less than 8 carbon atoms. The substituent R may also represent the trimethylsilyl group not more than one R in any R$_3$SiQ group being trimethylsilyl, and Q may represent, for example, —CH$_2$—, —CH$_2$CH$_2$—, —CH$_2$CHCH$_3$CH$_2$— or the phenylene radical. Preferably the R substituents are selected from methyl and phenyl radicals and Q is the —CH$_2$— or —CH$_2$CH$_2$— radical.

Complexes of the invention in which X represents chlorine, bromine, —NO$_3$, —NO$_2$, —O.CO.CH$_3$ or —SO$_4$ may be prepared by the reaction of (1) a silicon-containing phosphine of the formula (R'R''R'''P) in which R', R'' and R''' are as defined hereinabove, with (2) (a) a salt of the general formula MX$_2$ wherein M is Ni, Pd or Pt and each X represents Cl, Br, —NO$_3$, —NO$_2$, —O.CO.CH$_3$ or the X substituents when taken together represent the —SO$_4$ radical, or (b) an ammonium or alkali metal palladite or platinite.

The compounds employed as reactant (1) in the said preparative process are known materials. They may be prepared, for example, according to the process described in U.K. Pat. No. 1,179,242. Examples of such compounds include (CH$_3$)$_3$SiCH$_2$—P(C$_6$H$_5$)$_2$, (CH$_3$)$_2$(C$_4$H$_9$)SiCH$_2$P(C$_6$H$_5$)$_2$, (CH$_3$)(C$_8$H$_{18}$)$_2$SiCH$_2$CH$_2$P—(C$_6$H$_5$)$_2$, (CH$_3$)$_3$Si(CH$_2$)$_4$P(C$_2$H$_5$)$_2$ and [(CH$_3$)$_3$SiCH$_2$]$_2$P(C$_6$H$_5$).

Examples of reactant (2) which may be employed in the preparation of the complexes are NiCl$_2$, NiCl$_2$.6H$_2$O, NiBr$_2$, NiBr$_2$3H$_2$O, Ni(C$_2$H$_3$O$_2$)$_2$, NiSO$_4$xH$_2$O, Ni(NO$_3$)$_2$.6H$_2$O, Ni(NCS)$_2$, Pd(CH$_3$COO)$_2$, PdBr$_2$, PdCl$_2$, Na$_2$PdCl$_4$, Na$_2$PdCl$_4$.4H$_2$O, Pd(NO$_3$)$_2$, Na$_2$Pd(NO$_2$)$_4$, PtBr$_2$, PtCl$_2$, K$_2$PtCl$_4$, Na$_2$PtCl$_4$.4H$_2$44)$_2$PdCl$_4$ and (NH$_4$)$_2$PtCl$_4$.

Complexes wherein X is I or SCN are not so readily formed by the above described reaction as those in which X is, for example Cl or NO$_3$. Those complexes in which X is I or SCN are best prepared by a reaction involving halogen replacement, that is by forming the complex wherein X is chlorine by the reaction of (1) and (2) and thereafter reacting the product with an alkali metal halide or pseudohalide. An example of such a reaction is:

(R'R''R'''P)$_2$MCl$_2$ + 2NaI → (R'R''R'''P)$_2$MI$_2$ + 2NaCl

Complexes wherein one X is hydrogen may be prepared by the reaction of the appropriate complex in which the X substituents are halogen with a reducing agent, e.g., sodium borohydride, hydrazine hydrate or a mixture of ethanol and potassium hydroxide. This reaction is illustrated by the equation:

(R'R''R'''P)$_2$MCl$_2$ + NaBH$_4$ → (R'R''R'''P)$_2$MHCl

Complexes wherein X represents alkyl, aryl, aralkyl, alkaryl or R$_3$SiQ— may be prepared by the reaction of the halogen-containing complex with, for example, an alkylating agent such as (alkyl)MgCl, (alkyl)Li or R$_3$SiQLi. This reaction can be illustrated by the equation:

$$(R'R''R'''P)_2MCl_2 + (alkyl)MgCl \longrightarrow (R'R''R'''P)_2M\diagdown_{Cl}^{alkyl}$$

Formation of the complexes may be brought about by contacting the reactants, that is (1) and (2) or the product of (1) and (2) and any further reactant, at low, normal or elevated temperatures. In most cases temperatures from about −78° to about 70°C will be appropriate but higher temperatures may be employed, for example, when the preparative reaction involves fusion of the reactants in the absence of a solvent. Preferably the reactants are employed in stoichiometric or approximately stoichiometric proportions. Complexes in which X is hydrogen or hydrocarbon, e.g., alkyl, may be unstable at normal temperatures. They are therefore best prepared at temperatures below about 0°C.

If desired, mutual solvents, for example, hydrocarbons, alcohols or tetrahydrofuran, may be employed to facilitate mixing and reaction. The complexes are in general stable crystalline materials and, where stability permits, may be isolated by removal of any solvent employed during the reaction. If desired, they may be purified by recrystallisation.

The complexes of this invention, particularly the platinum complexes, are useful as catalysts for hydrosilylation reactions, that is, reactions involving the addition of silicon-bonded hydrogen atoms to unsaturated radicals. Included within the scope of this invention therefore is a process for the preparation of an organosilicon material which comprises reacting in the presence of a phosphorus-containing complex of the invention (a) a silicon-containing material having in the molecule at least one silicon-bonded hydrogen atom, and (b) an organic or organosilicon material containing aliphatic carbon atoms linked by multiple bonds.

As the silicon-containing material (a) there are preferably employed one or more silanes or organosiloxanes. Examples of such materials are CH$_3$SiHCl$_2$, C$_6$H$_5$SiHBr$_2$, HSi(OCH$_3$)$_3$, (CH$_3$)$_2$SiHCl, C$_2$H$_5$SiH$_2$Cl, CH$_3$SiH(OC$_2$H$_5$)$_2$, methylhydrogen polysiloxanes and copolymers of methylhydrogensiloxane units and, for example, dimethylsiloxane units, trimethylsiloxane units and phenylethylsiloxane units. The nature of the silicon-bonded substituents present in addition to the hydrogen atoms is not critical but normally such substituents will comprise halogen atoms, alkoxy radicals having less than 6 carbon atoms or monovalent hydrocarbon or halogenated hydrocarbon radicals having less than about 19 carbon atoms and free of aliphatic unsaturation.

The reactant (b) containing carbon atoms linked by multiple bonds may be organic, for example, pentene-1, hexene-1, acetylene, butadiene, vinylacetylene, cyclohexene, styrene, allyl bromide, vinyl acetate, or allyl alcohol, or it may be organosilicon, for example $(CH_3)_2(CH_2=CH)SiCl$, $(CH_2=CH.CH_2)_2SiBr_2$, $(CH_2=CH)Si(C_2H_5)_2Cl$ and organosiloxanes and polysiloxanes containing silicon-bonded vinyl and/or allyl radicals. Any remaining silicon-bonded substituents in the unsaturated organosilanes or organosiloxanes may be, for example, halogen atoms, alkoxy radicals having less than 6 carbon atoms or monovalent hydrocarbon radicals or halogenated hydrocarbon radicals, preferably having less than 19 carbon atoms.

The reaction of silicon-bonded hydrogen atoms with unsaturated radicals is well-known and may be employed for the preparation of organofunctional and other organosilicon compounds and in the preparation of curable organosilicon products. The hydrosilylation reaction may be performed at temperatures ranging from below 20°C up to temperatures of 150°C or higher.

The complexes of this invention are also useful as hydrogenation catalysts, the palladium complexes catalysing the hydrogenolysis of disilanes. Complexes wherein M is nickel catalyse the exchange of silicon-bonded chlorine atoms and silicon-bonded hydrogen atoms in hydrosilylation reactions when SiCl groups are present in one of the reactants. The nickel complexes may also be used to catalyse the polymerisation of acetylenic compounds and in the preparation of alpha,beta-unsaturated carboxylic acids and esters from acetylene. The complexes, especially those containing platinum, isomerise olefins.

The following examples illustrate the invention.

In the examples Me = methyl, Bu = n-butyl and Ph = phenyl.

EXAMPLE 1

Synthesis of $(Me_3SiCH_2PPh_2)_2NiCl_2$
$NiCl_2.6H_2O + 2Me_3SiCH_2PPh_2 \rightarrow (Me_3SiCH_2PPh_2)_2NiCl_2 + 6H_2O$ Nickel chloride hexahydrate (4.0 g., 1 mol.) was dissolved in ethanol (20 ml.). To this solution was added $Me_3SiCH_2PPh_2$ (9.2 g., 2 mol.) dropwise, with stirring, at 20°. A purple colour developed with the formation of a red solid. The reaction mixture was heated at 50°/1hr. and then filtered. The solid was washed with ethanol and dried. A red crystalline solid [m.p.161°(d)], soluble in common organic solvents was obtained. (Found: C, 56.7, H, 6.3; Cl, 10.25; P, 8.9; Si, 8.0. $C_{32}H_{42}Cl_2NiP_2Si_2$ requires C, 57,0; H, 6.2; Cl, 10.5; P, 9.2; Si, 8.3%).

EXAMPLE 2

Synthesis of $(Me_3SiCH_2CH_2PPh_2)_2NiCl_2$
$NiCl_2 6H_2O + 2Me_3SiCH_2CH_2PPh_2 \rightarrow (Me_3SiCH_2CH_2PPh_2)_2NiCl_2 + 6H_2O$.

Nickel chloride hexahydrate (2.05 g., 1 mol.) and $Me_3SiCH_2CH_2PPh_2$ (5.0 g., 2 mol.) were used for the preparation of $(Me_3SiCH_2CH_2PPh_2)_2NiCl_2$ (4.5 g., 74 percent) as a dark-red crystalline solid. The method of preparation was the same as described for $(Me_3SiCH_2PPh_2)_2NiCl_2$ in Example 1. (Found Cl, 8.7; P, 9.1; Si, 7.7. $C_{34}H_{46}Cl_2NiP_2Si_2$ requires Cl, 10.1, P, 8.8; Si, 8.0%).

EXAMPLE 3

Synthesis of $(Me_3SiCH_2PBu_2)_2NiBr_2$
$NiBr_2. 3H_2O + 2Me_3SiCH_2PBu_2 \rightarrow (Me_3SiCH_2PBu_2)_2NiBr_2 + 3H_2O$ The phosphine (3.29 g., 2 mol.) in ethanol (10ml.) was added dropwise to nickel bromide trihydrate (1.93 g., 1 mol.) in ethanol (20 ml.) at 20°. Immediately a purple red solution was obtained. The mixture was gently refluxed for 2 hours and then freed of volatiles to afford a solid (4.41 g., 91.3 percent). The solid was recrystallised from 80 percent ethanol to give reddish-violet crystals. (Found: C, 42.2; H, 8.5; Br, 22.6. $C_{24}H_{58}Br_2NiP_2Si_2$ requires C, 42.2; H, 8.5; Br, 23.4%).

EXAMPLE 4

Synthesis of $(Me_3SiCH_2PBu_2)_2PdCl_2$
$Na_2PdCl_4 + 2Me_3SiCH_2PBu \rightarrow (Me_3SiCH_2PBu_2)_2PdCl_2 + 2NaCl$ On shaking an ethanolic solution of the phosphine (1.31 g., 2.26 mol.) with $Na_2PdCl_4$ (0.735 g., 1 mol.) the initial red colour lightens to yellow and after filtering off the precipitated NaCl, evaporation of the solution yields lemon-yellow crystals of $(Me_3SiCH_2PBu_2)_2PdCl_2$ m.p. 55°–6° (0.6 g.). (Authentic H'NMR). (Found C, 44.6; H. 8.9; Cl, 11.5; $C_{24}H_{58}Cl_2PdP_2Si_2$ requires C, 44.9; H, 9.0; Cl, 11.1%).

EXAMPLE 5

Synthesis of $(Me_3SiCH_2PBu_2)_2PtCl_2$
$Na_2PtCl_4.4H_2O + 2Me_3SiCH_2PBu_2 \rightarrow (Me_3SiCH_2PBu_2)_2PtCl_2 + 2NaCl + 4H_2O$ Sodium chloroplatinite (1 g. 1 mol.) was dissolved in water (10 ml.) and stirred in an inert atmosphere with $Me_3SiCH_2PBu_2$ (1.03 g., 2 mol.) for about 3 hours until no further lightening of the supernatent liquid occurred. The precipitate was filtered and dried overnight at 20°/0.1 mm. and then at 30°/0.1 mm. for 1 hour.

The solid was recrystallised three times from ethanol to afford light-yellow crystals of almost pure trans-$(Me_3SiCH_2PBu_2)_2PtCl_2$ (0.30 g.,) (Authentic H'NMR) (Found C, 38.9; H, 7.9; Cl, 9.6. $C_{24}H_{58}Cl_2P_2PtSi_2$ requires C, 39.4; H, 7.9; Cl, 9.7%).

EXAMPLE 6

Synthesis of $[(Me_3SiCH_2)_3P]_2PtCl_2$
$K_2PtCl_4 + 2(Me_3SiCH_2)_3P \rightarrow [(Me_3SiCH_2)_3P]_2PtCl_2 + 2KCl$ $K_2PtCl_4$(1.13g., 1 mol.) was shaken with the phosphine (1.59 g., 2 mol.) in $H_2O$ (40 ml.)/EtOH (15 ml.) mixture at 20° for 48 hr. The white solid was filtered and washed with $H_2O$ (5 × 10 ml.) and then dried in vacuo. It was then crystallised from MeOH— $CH_2Cl_2$ (1:1) to yield pale yellow crystals (0.66g., 28.5 percent) of the required complex. (Found: C, 34.2; H, 7.8; Cl, 8.6. $C_{24}H_{66}Cl_2P_2PtSi_6$ requires C, 33.9; H, 7.8; Cl, 8.35%).

EXAMPLE 7

Hexene -1 ( 4.2 g. 1 mol.), $MeSiHCl_2$ (5.75 g., 1 mol.) and $(Me_3SiCH_2PBu_2)_2NiBr_2$ (0.1138 g., 3.33 × $10^{-3}$ mol.) were mixed together in a thick walled glass ampoule under argon. The ampoule was evacuated at −78°C., sealed, placed in an oil bath and brought to 120°C. After 16 hours the ampoule was removed from the bath and again cooled to −78° before opening. The reaction product was analysed by gas-liquid chromatography and was found to contain the following compounds.

A. Me(CH$_2$)$_3$CH(SiMeHCl)CH$_3$
B. Me(CH$_2$)$_5$SiMeHCl
C. Me(CH$_2$)$_3$CH(SiMeCl$_2$)CH$_3$
D. Me(CH$_2$)$_4$CH$_2$SiMeCl$_2$ in a ratio by weight of 5; 20; 10; 65 respectively, The overall yield was 73.4 percent.

Products A and B are the result of an SiCl/SiH exchange reaction. Products C and D are the normal hydrosilylation adducts.

EXAMPLE 8

A mixture of (Me$_3$SiO)$_2$SiMeH (0.55 g., 1 mol.), Me$_3$SiOSiMe$_2$Vi (0.43 g., 1 mol.), and trans[MeP(CH$_2$SiMe$_3$)$_2$]$_2$-PtCl$_2$ (5 μl of 3.53 percent by weight solution in toluene) was heated at 80° for 3 hours. Analysis (g.l.c.) of the reaction mixture indicated a quantitative reaction. The reaction products included (Me$_3$SiO)$_2$SiMeCH$_2$CH$_2$SiMe$_2$OSiMe$_3$ which was formed in an approximately 85 percent yield.

That which is claimed is:

1. A complex of the formula (R'R''R'''P)$_2$MX$_2$ wherein R' represents the R$_3$SiQ- group in which each R is a hydrocarbyl radical selected from the group consisting of alkyl, aryl, aralkyl, and alkaryl radicals having less than 19 carbon atoms and Q represents a divalent hydrocarbon radical having from 1 to 7 inclusive carbon atoms, R'' and R''' are each hydrocarbyl radicals selected from the group consisting of alkyl, aryl, aralkyl, and alkaryl radicals having less than 19 carbon atoms and the R$_3$SiQ— radical, M is an atom selected from the group consisting of Ni, Pd and Pt and each X is an anionic ligand selected from the group consisting of H, Cl, Br, I, —NO$_2$, —NO$_3$, —SCN, —OCOCH$_3$, hydrocarbyl alkyl, hydrocarbyl aryl, hydrocarbyl alkaryl and hydrocarbyl aralkyl radicals having less than 19 carbon atoms or the two X substituents taken together represent the —SO$_4$ radical; not more than one X being a hydrogen atom and the remaining X being Cl, Br or I when one X is hydrogen.

2. A complex as claimed in claim 1 wherein Q is selected from the group consisting of —CH$_2$— and —CH$_2$CH$_2$— radicals.

3. A complex as claimed in claim 1 wherein R is selected from the group consisting of methyl radicals and phenyl radicals.

4. A complex as claimed in claim 1 wherein each X represents a chlorine atom.

* * * * *